United States Patent
Zheng et al.

(10) Patent No.: US 12,473,735 B2
(45) Date of Patent: Nov. 18, 2025

(54) LIQUID APPLIED ROOFING SYSTEMS AND METHODS FOR FORMING ROOFS

(71) Applicant: BMIC LLC, Dallas, TX (US)

(72) Inventors: Yan Zheng, Livingston, NJ (US); Yixi Xiao, Edison, NJ (US); Daniel E. Boss, Morris Township, NJ (US); Adem Chich, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/182,550

(22) Filed: Mar. 13, 2023

(65) Prior Publication Data

US 2023/0212856 A1 Jul. 6, 2023

Related U.S. Application Data

(63) Continuation of application No. 17/037,053, filed on Sep. 29, 2020, now Pat. No. 11,613,892.

(Continued)

(51) Int. Cl.
*E04D 5/10* (2006.01)
*E04D 7/00* (2006.01)
(Continued)

(52) U.S. Cl.
CPC ............... *E04D 5/10* (2013.01); *E04D 7/00* (2013.01); *E04D 11/02* (2013.01); *E04D 12/002* (2013.01);
(Continued)

(58) Field of Classification Search
CPC .. E04D 5/10; E04D 7/00; E04D 11/02; E04D 12/002; B32B 2260/021; B32B 2307/7265; B32B 2419/06; B32B 3/266; B32B 3/30; B32B 27/12; B32B 2255/02; B32B 2262/0284; B32B 5/245; B32B 2266/06;
(Continued)

(56) References Cited

U.S. PATENT DOCUMENTS 1,182,414 A * 5/1916 Overbury .......... H01L 21/67132
428/491
1,902,872 A * 3/1933 Long ........................ E04D 5/10
428/179

(Continued)

FOREIGN PATENT DOCUMENTS

CA    2530192 C    2/2012
EP    2871053 A1   5/2015
(Continued)

OTHER PUBLICATIONS

Author Unknown; Roof Pitch Explained; https:/web.archive.org/web/20170606104758/https:www/pole-bam.info/roof-pitch.html; 2016.

(Continued)

*Primary Examiner* — Nathan L Van Sell
(74) *Attorney, Agent, or Firm* — GREENBERG TRAURIG, LLP

(57) ABSTRACT

A method of forming a sloped roof can comprise obtaining a base layer comprising at least one of a permeable mesh, woven fabric, non-woven fabric, plastic, foam material or combinations thereof; applying the base layer over a roofing substrate of the sloped roof; and applying a liquid roofing material to the base layer to form a liquid applied roof.

7 Claims, 11 Drawing Sheets

Related U.S. Application Data

(60) Provisional application No. 62/908,679, filed on Oct. 1, 2019, provisional application No. 62/908,765, filed on Oct. 1, 2019, provisional application No. 62/908,131, filed on Sep. 30, 2019.

(51) Int. Cl.
  *E04D 11/02* (2006.01)
  *E04D 12/00* (2006.01)

(52) U.S. Cl.
  CPC . *B32B 2260/021* (2013.01); *B32B 2307/7265* (2013.01); *B32B 2419/06* (2013.01)

(58) Field of Classification Search
  CPC ..... B32B 5/028; B32B 2255/06; B32B 5/022; B32B 5/26; B32B 2255/102; B32B 2260/046; B32B 2262/0253; B32B 2262/101; B32B 2307/718; B32B 2605/08; B32B 2605/12; B32B 2605/16; B32B 2605/18; B32B 3/04; B32B 5/18; B32B 2255/26; B32B 2255/28; B32B 2307/54; B32B 3/08; B32B 5/024; B32B 15/14; B32B 25/10; B32B 2255/10; B32B 2307/726; B32B 2307/73; B32B 2307/748
  See application file for complete search history.

(56) References Cited

U.S. PATENT DOCUMENTS

| | | | |
|---|---|---|---|
| 3,996,396 | A | 12/1976 | Hansen et al. |
| 4,217,742 | A | 8/1980 | Evans |
| 4,521,478 | A * | 6/1985 | Hageman .......... E04D 5/10 428/297.4 |
| 4,643,080 | A | 2/1987 | Trostle et al. |
| 4,668,315 | A | 5/1987 | Brady et al. |
| 4,909,135 | A | 3/1990 | Greko |
| 5,674,336 | A | 10/1997 | Coe |
| 5,693,133 | A | 12/1997 | Largent et al. |
| 5,848,510 | A | 12/1998 | Grazman et al. |
| 7,024,829 | B2 | 4/2006 | Sharp et al. |
| 7,272,915 | B2 | 9/2007 | Peng |
| 7,285,183 | B2 | 10/2007 | Kajander et al. |
| 7,765,763 | B2 | 8/2010 | Teng et al. |
| 7,882,670 | B2 | 2/2011 | West |
| 8,079,184 | B2 | 12/2011 | Wiercinski et al. |
| 8,309,211 | B2 | 11/2012 | Mehta et al. |
| 8,617,304 | B2 | 12/2013 | Wen et al. |
| 8,673,427 | B2 | 3/2014 | Kalkanoglu et al. |
| 8,689,510 | B1 | 4/2014 | Krumvieda |
| 8,863,442 | B2 | 10/2014 | Freeman |
| 9,334,655 | B2 | 5/2016 | Polumbus et al. |
| 9,512,342 | B1 | 12/2016 | Gutman |
| 9,551,152 | B2 | 1/2017 | Feuer et al. |
| 9,945,124 | B2 | 4/2018 | Baker |
| 9,963,880 | B2 | 5/2018 | Kraus et al. |
| 9,982,437 | B2 | 5/2018 | Barrego |
| 10,017,943 | B1 | 7/2018 | Zhou et al. |
| 10,253,502 | B2 | 4/2019 | Grube et al. |
| 11,613,892 | B2 | 3/2023 | Zheng et al. |
| 11,828,063 | B2 | 11/2023 | Zheng et al. |
| 2003/0159379 | A1 | 8/2003 | Pickler |
| 2005/0210808 | A1 | 9/2005 | Larson et al. |
| 2006/0059833 | A1 | 3/2006 | Pelzer et al. |
| 2006/0193995 | A1 | 8/2006 | Yong |
| 2007/0079926 | A1 | 4/2007 | Mehta et al. |
| 2007/0281119 | A1 | 12/2007 | Di Stefano et al. |
| 2008/0008858 | A1 | 1/2008 | Hong et al. |
| 2009/0013620 | A1 | 1/2009 | West |
| 2010/0108244 | A1 * | 5/2010 | Newton .......... D03D 19/00 156/229 |
| 2010/0173110 | A1 | 7/2010 | Wiercinski et al. |
| 2011/0173908 | A1 | 7/2011 | Kahle |
| 2011/0223410 | A1 | 9/2011 | Gencer et al. |
| 2011/0252740 | A1 | 10/2011 | Hamlin, III |
| 2013/0034721 | A1 | 2/2013 | Wang et al. |
| 2014/0072751 | A1 | 3/2014 | Bradenburg |
| 2014/0215963 | A1 | 8/2014 | Bradenburg et al. |
| 2014/0259972 | A1 | 9/2014 | Feuer et al. |
| 2015/0144250 | A1 | 5/2015 | Subotic et al. |
| 2015/0240495 | A1 | 8/2015 | Vermilion et al. |
| 2015/0361299 | A1 | 12/2015 | Byrne et al. |
| 2016/0177480 | A1 | 6/2016 | Cady et al. |
| 2017/0002231 | A1 | 1/2017 | Haberle et al. |
| 2017/0145697 | A1 | 5/2017 | Anthony |
| 2018/0245348 | A1 | 8/2018 | Prygon |
| 2019/0292789 | A1 | 9/2019 | Mallick et al. |
| 2021/0095467 | A1 | 4/2021 | Zheng et al. |

FOREIGN PATENT DOCUMENTS

| | | |
|---|---|---|
| GB | 2428207 A | 1/2007 |
| GB | 2441054 A | 2/2008 |
| GB | 2473681 A | 3/2011 |
| GB | 2498138 A | 7/2013 |
| JP | 2004-251102 A | 9/2004 |
| JP | 3992147 B2 | 10/2007 |
| JP | 2016108935 A | 6/2016 |
| KR | 100785333 B1 | 12/2007 |
| KR | 20090087979 A | 8/2009 |
| WO | WO99/40271 A1 | 8/1999 |
| WO | WO2012/162845 A1 | 12/2012 |
| WO | WO2018/154427 A1 | 8/2018 |
| WO | WO2019/074866 A1 | 4/2019 |

OTHER PUBLICATIONS

Youtube: "How to Install TPO/PVC Coating I GAF Roof Mate"; https://www.youtube.com/watch?v=utrSOcyr-ol; dated Mar. 20, 2019.
International Search Report and the Written Opinion of the International Search Authority for PCT/US2020/053328, mailed Dec. 22, 2020.
Extended European Search Report for European Application No. EP 20870836.2; dated Oct. 5, 2023.
Extended European Search Report for European Application No. EP 20872711.5; dated Nov. 22, 2023.
Anonymous; The 8 Secrets About Melt-blown Nonwoven Fabric; G&F Group Inc.; URL:https://www.groupgf.com/info-detail/the-8-secrets-about-melt-blown-nonwoven-fabric; pp. 1-7; Mar. 17, 2022.
Guowei, Wang et al.; Facile synthesis of flexible microporous polypropylene sponges for separation of oil and water; Scientific Reports 6, Article No. 21265 (2016); URL;https://www.nature.com/articles/srep21265; pp. 1-6; Feb. 16, 2016.
Supplementary Partial European Search Report for European Application No. EP 20872711.5; dated Sep. 21, 2023.

* cited by examiner

LIQUID APPLIED ROOFING SYSTEMS AND METHODS FOR FORMING ROOFS

RELATED APPLICATIONS

The present application is a continuation of co-pending U.S. patent application Ser. No. 17/037,053, filed Sep. 29, 2020, which claims benefit of U.S. Provisional Patent Application No. 62/908,131, filed Sep. 30, 2019, and claims the benefit of the filing dates of U.S. Provisional Patent Application No. 62/908,765, filed Oct. 1, 2019; and U.S. Provisional Patent Application No. 62/908,679, filed Oct. 1, 2019.

INCORPORATION BY REFERENCE

The disclosures and figures of U.S. patent application Ser. No. 17/037,053, filed Sep. 29, 2020, U.S. Provisional Patent Application No. 62/908,131, filed Sep. 30, 2019, U.S. Provisional Patent Application No. 62/908,765, filed Oct. 1, 2019; and U.S. Provisional Patent Application No. 62/908,679, filed Oct. 1, 2019, are incorporated by reference herein for all purposes as if fully set forth in their entirety.

TECHNICAL FIELD

This disclosure relates generally to roofing and, more specifically, to the application and use of liquid roofing materials for forming roofs, including steep slope residential roofs, and temporary water shedding roofs that can be converted to a permanent roof at a later time.

BACKGROUND

Residential roofing has been dominated by shingle, tile, or slate for a long time. On the other hand, liquid applied waterproof roofing has proven to be a cost effective high performance roof covering for low slope commercial buildings. While liquid roofing materials have been used on low slope commercial roofs for some time, the use of liquid roofing materials on steep slope residential roofs has been hampered by the difficulty of preventing or controlling flowing and sagging of the liquid roofing material before it cures. A need exists for systems and methods for preventing or at least controlling flowing and sagging when a liquid applied roofing is applied to a steep slope roof or other pitched surface. A further need exists to form a watertight seal between the roofing product and various structures projecting from the roof such as, for example, ridge vents, attic vents, furnace vents, and the like.

In addition, natural disasters, such as hurricanes and tornados, often strip roofing shingles and other roofing products off many roofs in one area at one time. This invariably results in a shortage of materials and labor in the area for replacing the damaged roofs. It can take days or weeks before a permanent replacement roof can be installed. During this time, rainwater can penetrate to the interior of a home causing serious damage. There is a need for a temporary roofing system that is easy and quick to install, forms a seal against water penetration, is far less labor and material dependent than a permanent roof, and is convertible to a permanent roof at a later time when labor and material supplies have been replenished.

The present disclosure is directed to roofing systems and methods that address the foregoing and other related, and unrelated, issues in the art.

SUMMARY

Briefly described, according to the present disclosure, sagging of liquid roofing materials sprayed, rolled, or otherwise applied or deposited onto a roof substrate or other surface that is pitched more than about 30 degrees (e.g. a steep slope roof) can be controlled mechanically, chemically, or by adding fillers or other materials to a liquid roofing material prior to application thereof.

An aspect of the present disclosure includes systems for preventing, controlling, or inhibiting flowing and sagging of a liquid roofing material applied to a roofing substrate or surface of a sloped roof, for example, a roof pitched at greater than 30 degrees, such as described with respect to various embodiments of the present disclosure.

Another aspect of the present disclosure includes methods of preventing, controlling, or inhibiting flowing and sagging of a liquid roofing material applied to a roofing substrate or surface of a sloped roof, for example, a roof pitched at greater than 30 degrees, such as described with respect to various embodiments of the present disclosure.

By way of example, and without limitation, in one embodiment, a sloped roof can be formed by a method including, obtaining a base layer, which can comprise at least one of a permeable mesh, woven fabric, non-woven fabric, plastic, foam material or combinations thereof; applying the base layer over a roofing substrate of the sloped roof; and applying a liquid roofing material to the base layer to form a liquid applied roof.

In one embodiment, applying the base layer can comprise attaching the base layer to the roofing substrate using fasteners.

Additionally, the method can include attaching a roof mounted structure or other structure over the base layer and to the roofing substrate with fasteners, with a portion of the base layer extending past a bottom surface of the roof mounted structure. The liquid roofing material also can be adapted to flow about the fasteners and at least partially into openings formed thereby.

In one embodiment, the roof mounted structure can comprise a drip edge having a forward edge positioned over a lower edge of the roofing substrate, and the method further can comprise positioning an underlayment along the roofing substrate with at least a portion or the underlayment overlapping at least a portion of the base layer. A water drainage path can be defined along the roofing substrate and over the forward edge of the drip edge.

The method also can comprise positioning an underlayment along at least a portion of the roofing substrate, with at least a portion of the underlayment partially overlapping the base layer. The underlayment can be permeable so as to enable penetration of at least a portion of the liquid roofing material therethrough.

The liquid roofing material can pass through at least a portion of the base layer so as to seal the base layer.

Furthermore, the method can comprise positioning spacers between the base layer and the roofing substrate, with a space defined below the base layer, and receiving at least a portion of the liquid roofing material in the space.

In still a further embodiment, an emergency, temporary roofing system can be formed along the roof structure, including a base layer comprising a mesh or fabric sheet that is lipophilic, and which will be coated or covered with a top layer of material that is sufficiently hydrophobic to repel and shed rainwater. The temporary roofing system can be rolled onto roof that has been damaged or stripped, and fastened to the roofing substrate or deck to provide immediate, temporary protection from rain for the building and roof structure below, which protection can last for weeks or months. When materials and labor are available, the hydrophobic top layer can be removed, such as by being peeled off, dissolved, or otherwise removed, and a liquid roofing material can be applied to the lipophilic base. The liquid roofing material will soak, wet or substantially penetrate or be absorbed into the mesh or fabric material of the base layer to an extent sufficient to form a bond therewith and create a permanent protective roof.

As an example, and without limitation, in one embodiment, a temporary roofing system can include a base layer and a protective layer. The base layer can comprise a mesh or fabric having lipophilic properties and adapted to be applied to a roofing substrate. The protective layer can be positioned along an upper facing surface of the base layer, and comprise a hydrophobic material. The protective layer is removable and adapted to reduce water flow through the base layer. The base layer is configured to receive a liquid roofing material to form a permanent roofing structure.

The protective layer can comprise a sheet of the hydrophobic material releasably attached to the upper facing surface of the base layer.

The base layer further can comprise a mesh or fabric configured to be overlaid onto the roofing substrate, and the protective layer can comprise a lipophilic coating applied to the base layer.

The lipophilic coating can comprise a material adapted to dissolve upon contact with the liquid roofing material.

The base layer further can comprise a plurality of restraining features adapted to restrain flow of the liquid roofing material.

In another aspect, the present disclosure comprises methods of forming a sloped roof with roof mounted structures installed therealong, for liquid applied roofing systems as embodied in the examples described and illustrated in the present disclosure. For example, and without limitation a method of forming a sloped roof may comprise obtaining a base layer comprising a permeable mesh, woven fabric, non-woven fabric, plastic, foam material or combinations thereof, positioning the base layer over at least a portion of a roofing substrate of the sloped roof; and coating the base layer with a liquid roofing material. The base layer can be adapted to allow penetration of the liquid roofing material therethrough and restrain flow of the liquid roofing material along the roofing substrate.

Additionally, the method can include introducing fillers into the liquid roofing material prior to coating the base layer with the liquid roofing material.

In one embodiment, obtaining the base layer can comprise obtaining a permeable web or sheet configured with a plurality of restraining features adapted to restrain flowing of the liquid roofing material.

The liquid roofing material further can comprise at least one of bulking materials, fillers or combinations thereof.

Also, the method further can comprises attaching a roof mounted structure to the roofing substrate with fasteners, with the liquid roofing material being adapted to flow about the fasteners and at least partially into openings formed in the roofing substrate by the fasteners.

In another aspect of the present disclosure, a temporary roofing material is provided substantially as embodied in the examples described in the present disclosure. Still another aspect of the present disclosure includes methods of roofing residential and other roof structures substantially as embodied in the examples described in the present disclosure.

As yet another example, and without limitation, a method of forming a sloped roof can comprise applying the liquid roofing material along a surface of a roofing substrate of the sloped roof and, as the liquid roofing material is applied to the roofing substrate, introducing a plurality of bulking materials into the liquid roofing material. The bulking materials can be mixed with the liquid roofing material so as to restrain flowing of the liquid roofing material along the surface of the roofing substrate. The plurality of bulking materials can include a string or yarn. And, the method further can comprise applying one or more additional liquid roofing materials along the roofing substrate.

In further aspects, a roof mounted structure, such as a ridge vent, attic vent, twirl vent, or other roof mounted structure can be mounted along the roofing substrate or deck of a sloped or pitched roof, such as by fasteners driven through a portion of the roof mounted structure and the roofing substrate or deck. Other types of roof mounted structures, such as a drip edge and/or other structures, also can be mounted along the roof. The roof mounted structure typically has a body that projects upwardly from a roof when the structure is mounted to the roofing substrate or deck. At least one base layer will be applied over the roofing substrate or deck, generally positioned below the roof mounted structure, with a portion of the base layer projecting or extending outwardly from a bottom portion of the body of the roof mounted structure and along the roofing substrate or deck.

The base layer can include a material that is pervious to a liquid roofing material, for example, in one embodiment, including a fabric or mesh material that can be embedded in and integrated with the liquid roofing material when the liquid roofing material is applied and cured. Alternatively, the base layer can include a more rigid material with holes to allow the liquid roofing material to seep or pass through and beneath the base layer so that the base layer becomes embedded in the liquid roofing material when cured.

These and other aspects, features, and advantages will be understood better upon review of the following detailed description.

DETAILED DESCRIPTION

Figure 1:
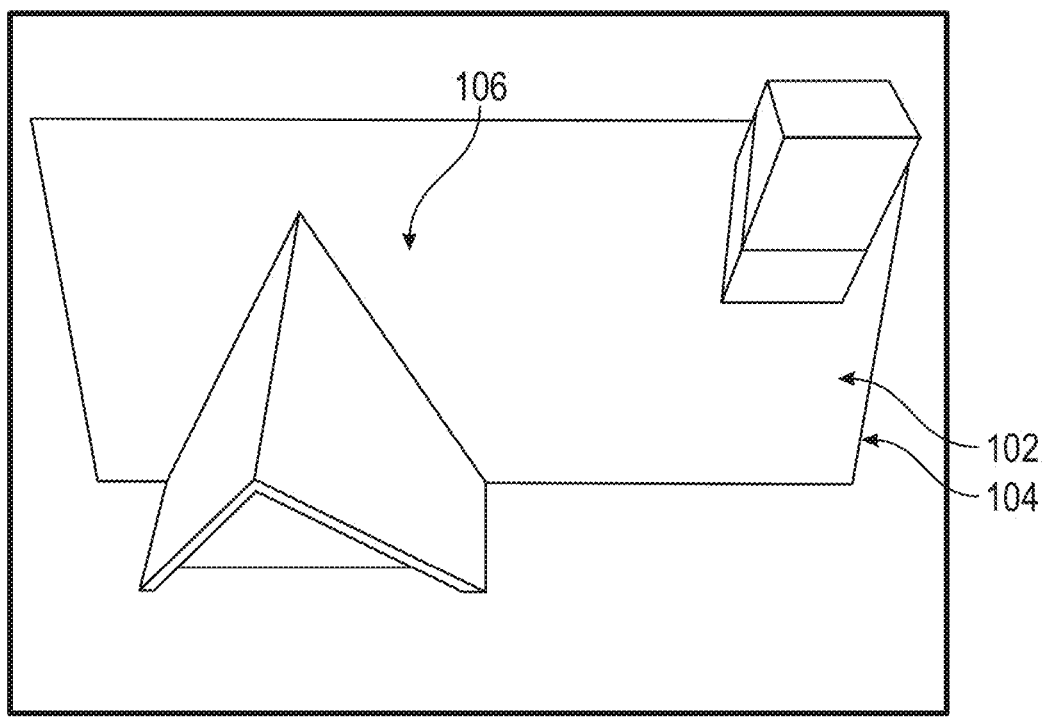
FIG. 1 illustrates coverage of a sloped roof using a liquid roofing material applied according to the principles of the present disclosure and having a short setting time.

Various example embodiments are shown in the accompanying drawing figures. Throughout the description, the term "liquid roofing material" refers to any of a number of coatings, sealants or other roofing materials applied in liquid form to a substrate or decks of systems and methods of forming steep sloped or pitched roof structures having liquid roofing materials. Example liquid roofing materials can include, TOPCOAT® brand liquid roofing, Roofmate® brand coatings, Instaset® brand coatings, and Streetbond® brand coatings all available from GAF of Parsippany, NJ Many other coatings that are applied as a liquid and cure to form a waterproof membrane are available or can be created according to principles of the present disclosure.

More generically, the term "liquid roofing material" may refer to a roofing formulation applied as a liquid with viscosity between 100 centipoises ("CPS") and 10,000,000 CPS and containing 20% to 100% weight percentage of resin materials. Unless otherwise specified, the viscosities detailed herein are measured at 70 degrees Fahrenheit. In some embodiments, the liquid roofing material can include formulations with viscosities between 100 CPS to 1,000,000 CPS; 100 CPS to 500,000 CPS; 100 CPS to 100,000 CPS; 100 CPS to 50,000 CPS; 1,000 CPS to 10,000 CPS; 5,000 CPS to 50,000 CPS; 10,000 CPS to 100,000 CPS; 50,000 CPS to 500,000 CPS; 100,000 CPS to 1,000,000 CPS. In addition, the liquid roofing material can include resin materials in ranges of 20% to 90%; 20% to 80%; 20% to 70%; 20% to 60%; 20% to 50%; 20% to 40%; 20% to 30%; 30% to 90%; 30% to 80%; 30% to 70%; 30% to 60%; 30% to 50%; 30% to 40%; 40% to 90%; 40% to 80%; 40% to 70%; 40% to 60%; 40% to 50%; 50% to 90%; 50% to 80%; 50% to 70%; 50% to 60%; 60% to 90%; 60% to 80%; 60% to 70%; 70% to 90%; 70% to 80%; or 80% to 90%.

Resin materials for use with or as a part of the liquid roofing material may include, without limitation, polysiloxane, polyurea, polyurethane, silane modified ether, silane modified ester, silane modified polyurethane, silane modified polyurea, epoxy, acrylic, poly acrylic, or any precursors that will crosslink after application to form such polymers, or any combination of the above. A "liquid applied roof" is a roof resulting from the application of a liquid roofing material.

The term "roofing" is used to simplify the description herein. However, this term is meant to encompass any part of a building structure and its additions, peripherals, or attachments, including sloped or pitched roofs that have a slope between 30 degrees and 180 degrees (meaning the back side of the structure). In embodiments, the slope can be between 30 degrees and 80 degrees, 30 degrees and 70 degrees, 30 degrees and 60 degrees, 30 degrees and 50 degrees, 30 degrees and 40 degrees, 30 degrees and 90 degrees, 40 degrees and 90 degrees, 50 degrees and 90 degrees, 60 degrees and 90 degrees, or 70 degrees and 90 degrees. This term also encompasses flat roofs or roofs that include sloped/pitched and flat portions.

Embodiments of the present disclosure further are not limited to commercial or residential structures, and are applicable to a variety of building structures and building components. For example, in addition to roofing structures or systems, various embodiments and features of the systems and methods can be used with walls, such as perpendicular, slanted or slope walls or partitions, permanent and temporary partitions, beams, columns, slabs, etc. or other features or components of commercial, residential, temporary or other building structures.

Still further, embodiments of the present disclosure also can be uses with other structures or structural components, such as for use with vehicle structures, e.g. motor vehicle structures and components (e.g., vehicle body, chassis, or other structural components of a motor vehicle), aerial vehicle structures and components (e.g., fuselage, wings, airfoil or other structural component of an aerial vehicle), or maritime vehicles and components (e.g., hull, propeller/rotor, or other structural component of a maritime vehicle).

Liquid roofing materials are applied on such structures with an initial wet thickness between 5 and 500 mils in a single pass, and/or are applied to form a dry film having a thickness between 3 and 250 mils with a single pass. Multiple passes also can be used to build up more thickness if necessary, with each pass having similar thickness ranges. Other thickness ranges also can be used for example, and without limitation, initial wet thicknesses of 5-400 mils, 5-300 mils, 5-200 mils, 5-100 mils, 5-50 mils, 10-500 mils, 200-500 mils, 300-500 mils and/or dry film thicknesses of 3-200 mils, 3-150 mils, 3-100 mils, 3-50 mils, 10-50 mils, 25-250 mils, 50-250 miles, 100-250 mils, 150-250 mils, or 200-250 mils, or 400-500 mils; or other suitable ranges, can be used. "Roofing" may include any original or modified material including wood decking, roof membranes, roof panels, asphalts, soil, or pre-existing coatings, but does not include traditional shingles, roof tiles, or roof slates.

The terms "fabric," or "underlayment fabric," and terms of similar import may refer to a woven or non-woven material, a mesh, open-cell foam, or similar material to which a liquid roofing material sticks or into which a liquid roofing material soaks, or that is at least partially soluble in a liquid roofing material when applied. These terms include composite structures containing woven or nonwoven material, meshes, open cell foam, and other materials. Fabrics are generally used as or incorporated into underlayments for liquid roofing materials. The fabrics can include aesthetic features printed, woven, or otherwise provides thereon to provide the structures with certain designs, appearances, textures, etc.

In some embodiments, the present disclosure is directed to formation of roof structures using liquid roofing materials, whereby flowability and/or sagging of a liquid roofing material during or upon application to a pitched surface can be controlled. The result is a roof membrane with a relatively uniform thickness in each application pass, forming substantially monolithic coverage with uniform thickness, and achieve longer service life and better weathering ability. The resulting membrane or cure liquid roofing material further can act as a vapor permeable water shedding layer for the structure.

In some embodiments, sagging can be contained by applying a liquid roofing material having a short setting time of less than 60 seconds to a roofing substrate or base layer of a steep slope roof. The short setting time can include 30 seconds to 60 seconds, 40 seconds to 60 seconds, or 50 seconds to 60 seconds. For example, in an example shown in FIG. 1, a liquid roofing material 102 including a Topcoat® brand top coat liquid roofing material with a short setting time was applied to a model steep slope roof 104 and allowed to cure. The short setting time of the liquid roofing material 102 successfully controlled sagging and resulted in a roofing membrane 106 formed along the steep slope roof 104 with substantially constant thickness. The setting or open time for typical silicone coatings such as Topcoat® is between 30-90 minutes, whereas setting time for acrylic coatings typically is between 2-4 hours.

In another embodiment, the flowing and sagging of liquid roofing materials on pitched surfaces of a steep slope roof can be controlled by adding solid fillers to the liquid roofing materials. The particles of the fillers should approximate a desired application thickness of the liquid roofing material. In this way, the flowing and sagging behavior of binders in the liquid roofing material tend to be restrained by the fillers. Such fillers can be incorporated into some commercially available liquid roofing products such as Instaset® and Streetbond® discussed above.

Figure 2:
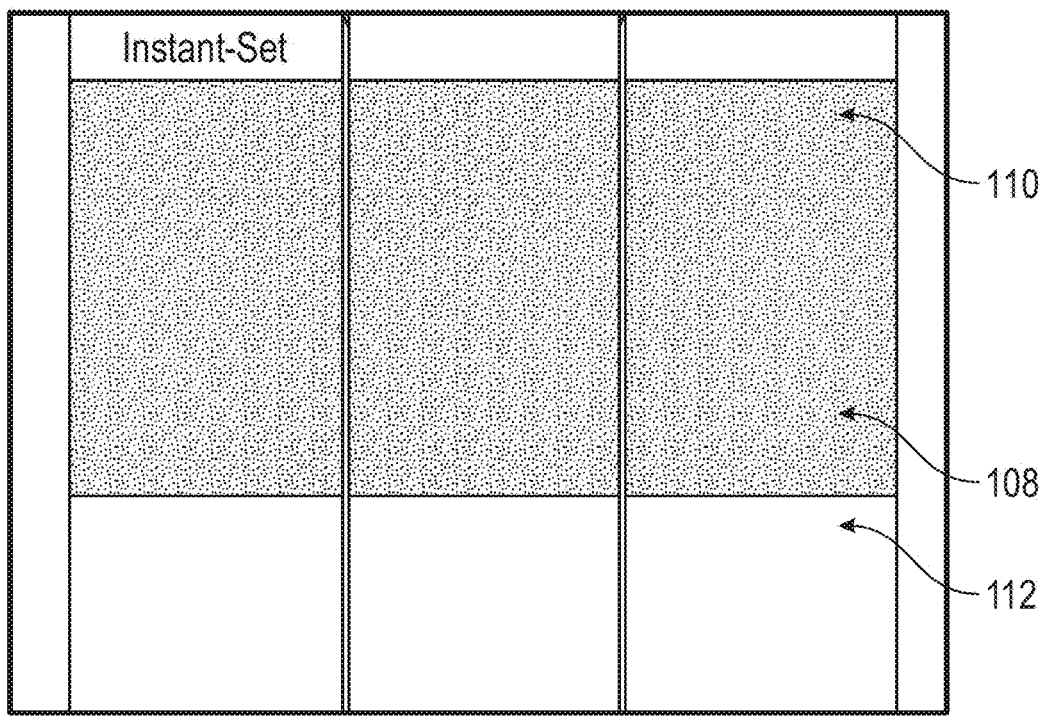
FIG. 2 illustrates the results of applying a liquid roofing material with a short setting time according to the principles of the present disclosure to a sloped roof surface having a 60 degree pitch.
Figure 3:
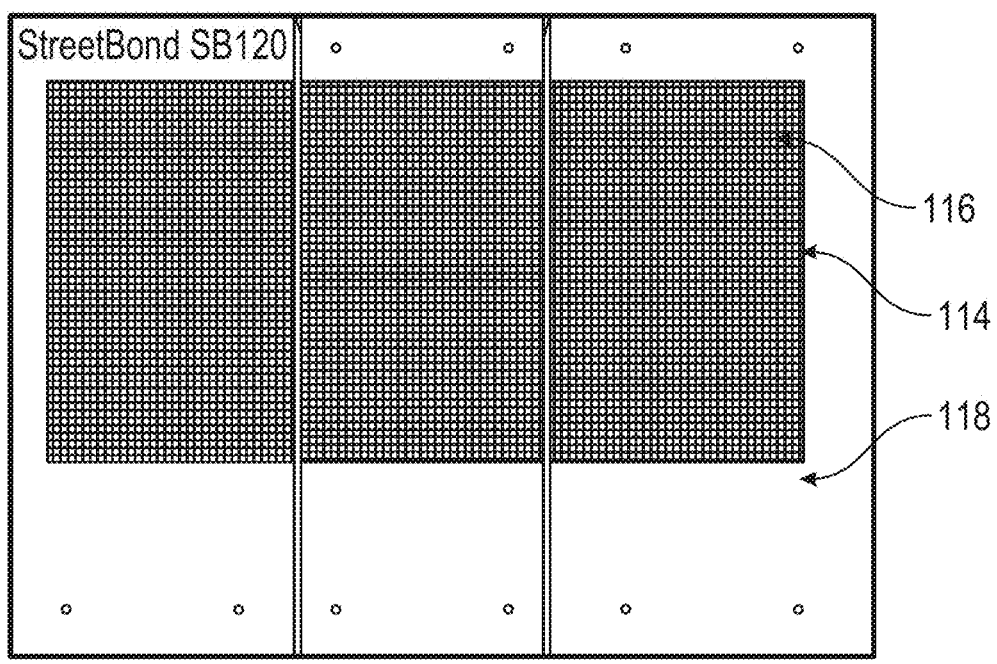
FIG. 3 illustrates another embodiment according to the principles of the present disclosure, illustrating application of a liquid roofing material with fillers that restrain sagging.

FIG. 2 illustrates an example of a roofing membrane 108 created by application of a liquid roofing material including Instaset® 110 to a wooden roofing substrate or deck surface 112 pitched at 60 degrees. FIG. 3 illustrates a roofing membrane 114 created by application of a liquid roofing material including Streetbond® 116 to a wooden roofing substrate surface 118 pitched at 60 degrees. In each case, no or very little sagging was observed and a substantially uniform thickness was obtained.

Figure 4:
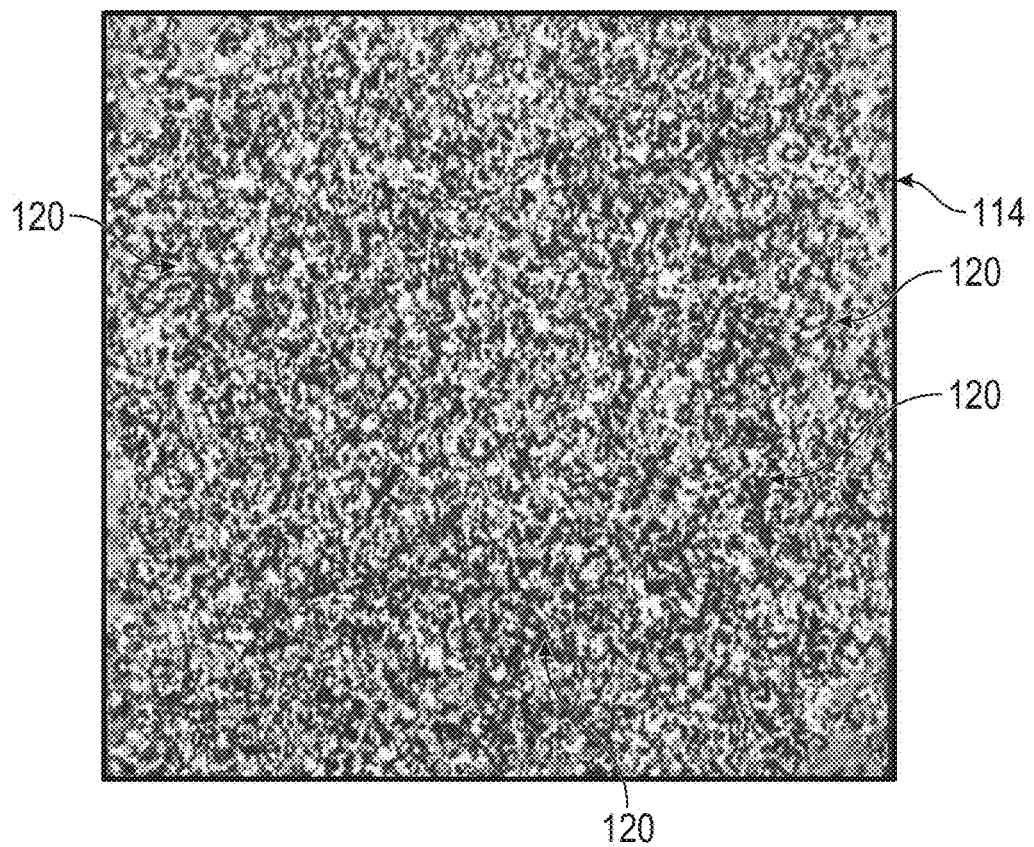
FIG. 4 illustrates another embodiment according to the principles of the present disclosure, illustrating application of a liquid roofing material with colored PVC flakes in addition to fillers.

In a further embodiment, sagging can be restrained further by the addition of ancillary fillers to liquid roofing materials. FIG. 4 illustrates an example including the addition of PVC flakes or particles 120 as an ancillary filler introduced into liquid roofing material 122 (e.g., a silicone-based liquid roofing material) prior to its application along a base layer or roofing substrate or deck. Not only do the flakes restrain flowing and sagging, they also lend an interesting appearance and texture to the liquid roofing material 122. The liquid roofing material 122 is transparent in this example.

Figure 5:
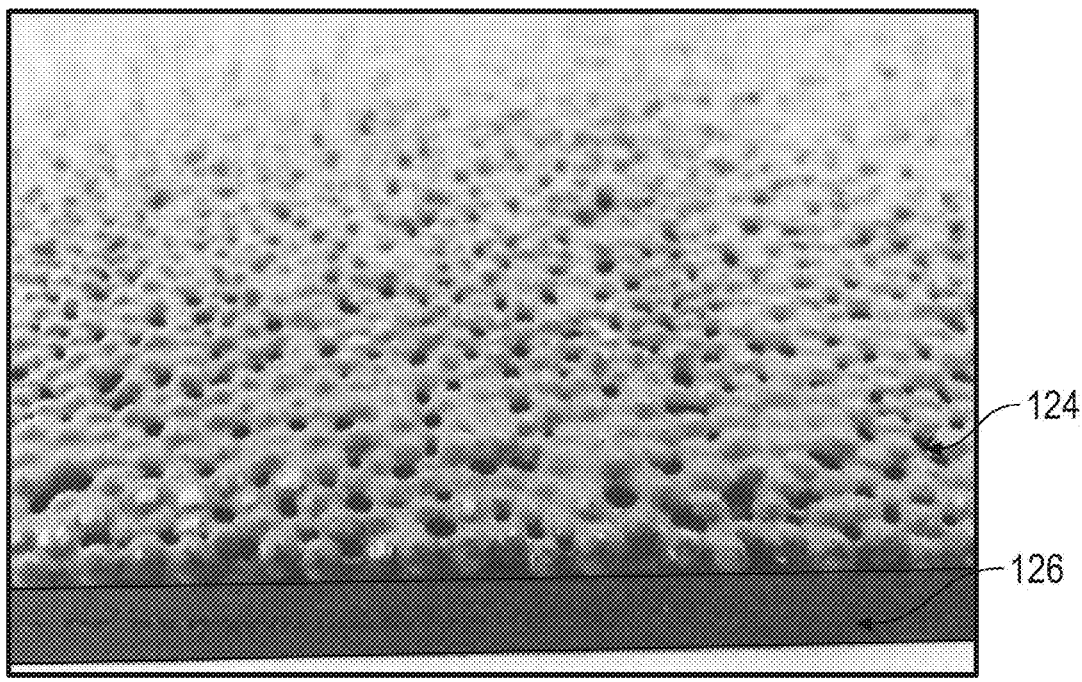
FIG. 5 illustrates another embodiment according to the principles of the present disclosure, illustrating application of a liquid roofing material with embedded expanded polystyrene foam beads in addition to fillers.

FIG. 5 illustrates an example of adding expanded polystyrene foam beads 124 as an ancillary filler in a liquid roofing material 126 (e.g., including an acrylate-based liquid roofing coating). Flowing and sagging were successfully restrained by the embedded beads and a substantially uniform thickness also was obtained.

Additional layers of liquid roofing material also can be applied to the resultant, cured liquid roofing materials 122/126 shown in FIGS. 4 and 5, for example to fill gaps and to create a unitary, monolithic, and uniform membrane.

Figures 6A, 6B, 6C, 6D:
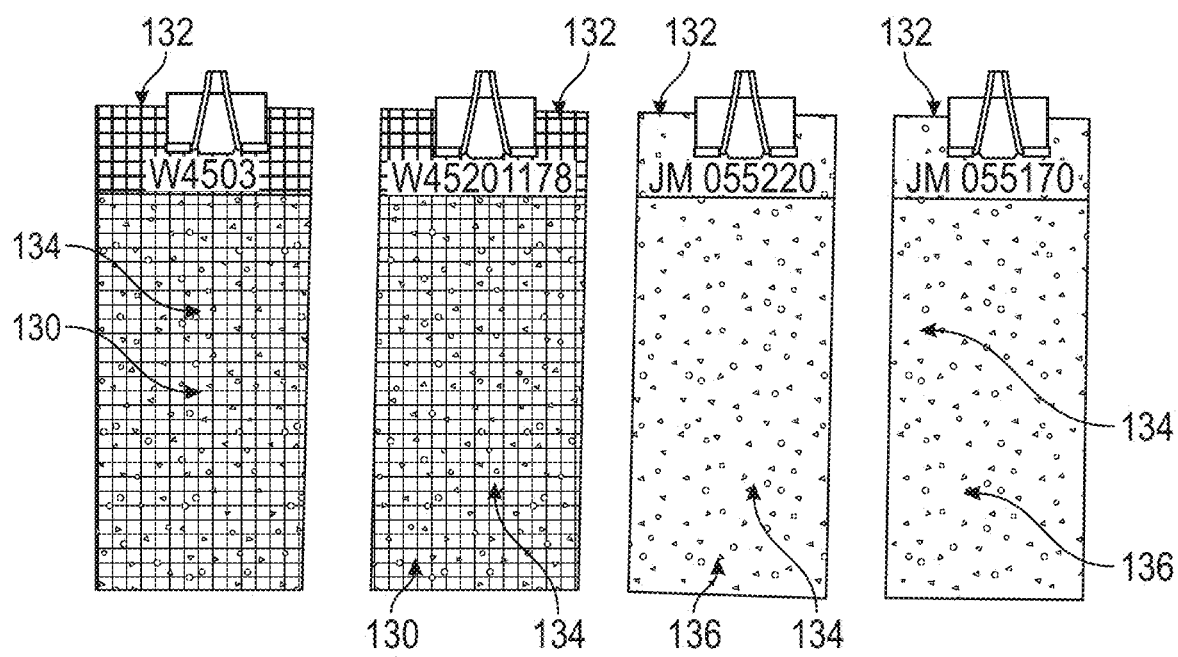
FIGS. 6A-D illustrate another embodiment according to the principles of the present disclosure, illustrating application of a liquid roofing material onto examples of a single mesh reinforced fabric underlayment (FIGS. 6A-B) and onto two non-reinforced fabric underlayments (FIGS. 6C-D).

Flowing and sagging behavior of a liquid roofing material further can be restrained in additional, other embodiments by pre-installing a base layer, which can include a failure or mesh material positioned over/along a substrate or roof deck a pitched roof. As illustrated in FIGS. 6A-B, in such an embodiment, a mesh base layer 130 can be rolled, laid or otherwise positioned or applied to a pitched or sloped roofing substrate 132. A liquid roofing material 134 is then applied over the mesh base layer 130. The mesh size of the base layer can depend on the rheology of the liquid roofing material used. For example, more flowable materials may require a smaller mesh size, while less flowable materials may require larger mesh size. Thus, the mesh base layer can be selected and/or configured based on slope or pitch of the roofing substrate and the flowability of the of the liquid roofing material, e.g., to confine the flowing and sagging of the liquid roofing material to each grid of the mesh, rather than globally along the surface of the roofing substrate.

Generally, the mesh size of the base layer is less than 25 mm. For example, it has been found that a base layer with a mesh size between about 1 mm square and 10 mm square is effective for most liquid roofing materials. In embodiments, the mesh size is between 1 mm and 25 mm, between 5 mm and 25 mm, between 10 mm and 25 mm, between 1 mm and 20 mm, between 1 mm and 15 mm, between 1 mm and 9 mm, between 1 mm and 8 mm, between 1 mm and 7 mm, between 1 mm and 6 mm, between 1 mm and 5 mm, between 1 mm and 4 mm, between 1 mm and 3 mm, between 1 mm and 2 mm, between 2 mm and 10 mm, between 2 mm and 9 mm, between 2 mm and 8 mm, between 2 mm and 7 mm, between 2 mm and 6 mm, between 2 mm and 5 mm, between 2 mm and 4 mm, between 2 mm and 3 mm, between 3 mm and 10 mm, between 3 mm and 9 mm, between 3 mm and 8 mm, between 3 mm and 7 mm, between 3 mm and 6 mm, between 3 mm and 5 mm, between 3 mm and 4 mm, between 4 mm and 10 mm, between 4 mm and 9 mm, between 4 mm and 8 mm, between 4 mm and 7 mm, between 4 mm and 6 mm, between 4 mm and 5 mm, between 5 mm and 10 mm, between 5 mm and 9 mm, between 5 mm and 8 mm, between 5 mm and 7 mm, between 5 mm and 6 mm, between 6 mm and 10 mm, between 6 mm and 9 mm, between 6 mm and 8 mm, between 6 mm and 7 mm, between 7 mm and 10 mm, between 7 mm and 9 mm, between 7 mm and 8 mm, between 8 mm and 10 mm, between 8 mm and 9 mm, or between 9 mm and 10 mm.

Sagging control also can be realized by pre-installation of a base layer including a fabric underlayment or pre-sprayed open cell foam as an underlayment. Such permeable base layers allow effective wetting and soaking of the liquid roofing material and help maintain the coating thickness at approximately the thickness of the underlayment material of the base layer. Composites of fabric and foam underlayments with a mesh material also may be used to control thickness and limit sagging as the base layer over which the liquid roofing material is applied.

FIGS. 6A-D show the result of a test application of a liquid roofing material 134 to two base layers 130 including two mesh reinforced fabrics (FIGS. 6A-B) and two fabric underlayments 136 without mesh reinforcement (FIGS. 6C-D) at a 90 degree pitch (vertical). Substantially uniform thicknesses were obtained in each case.

Figure 7:
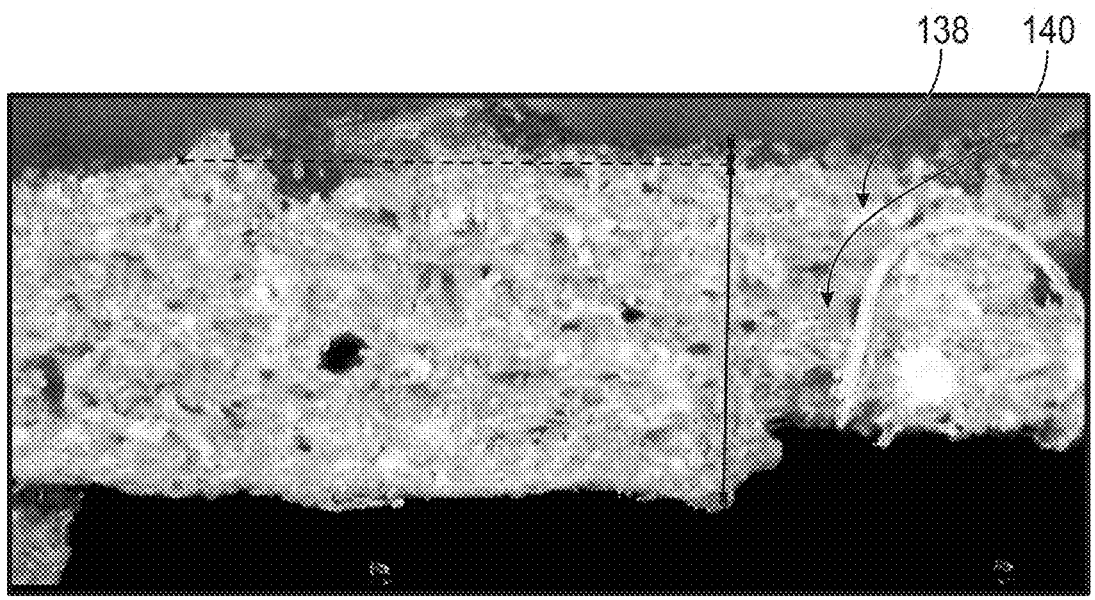
FIG. 7 illustrates a cross section of a membrane or roofing structure formed by the cured liquid roofing material and reinforced mesh underlayment of FIGS. 6A-B.

FIG. 7 shows a cross section of the resulting coating of the example of FIGS. 6C-D. For this example, test application, as shown in FIG. 7, a liquid roofing material 138 including a Roof Mate® topcoat acrylate coating was applied on a base layer 140 including a Freudenberg 50 gsm PET fabric. The liquid roofing material 138 is seen to have completely soaked into the base layer 140 and is distributed through the entire thickness thereof. Thus, a substantially uniform thickness defined by the thickness of the base layer 140 is obtained.

Figure 8:
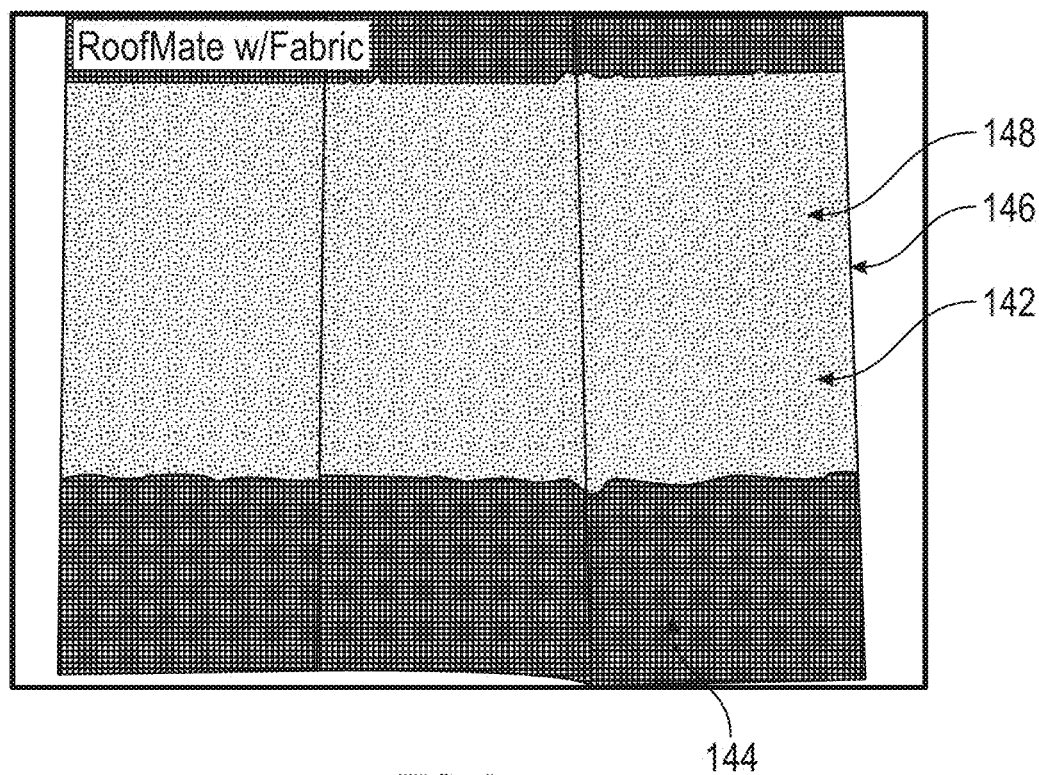
FIG. 8 illustrates another embodiment according to the principles of the present disclosure, illustrating application of a liquid roofing material to a surface pitched at 60 degrees with a fabric underlayment or base layer.

FIG. 8 illustrates an example embodiment wherein a liquid roofing material 142 including a Roofmate® brand liquid roofing material was applied to a base layer 144 including a non-woven fabric underlayment applied or positioned along a simulated roofing substrate or deck 146 for a sloped or pitched roof, arranged at a 60 degree pitch. In this case, the base layer 144 was formed to define features mimicking raised ridges along the roofing substrate 146. A membrane 148 of uniform thickness was formed across the fabric 144, including across the raised ridges.

Figure 9:
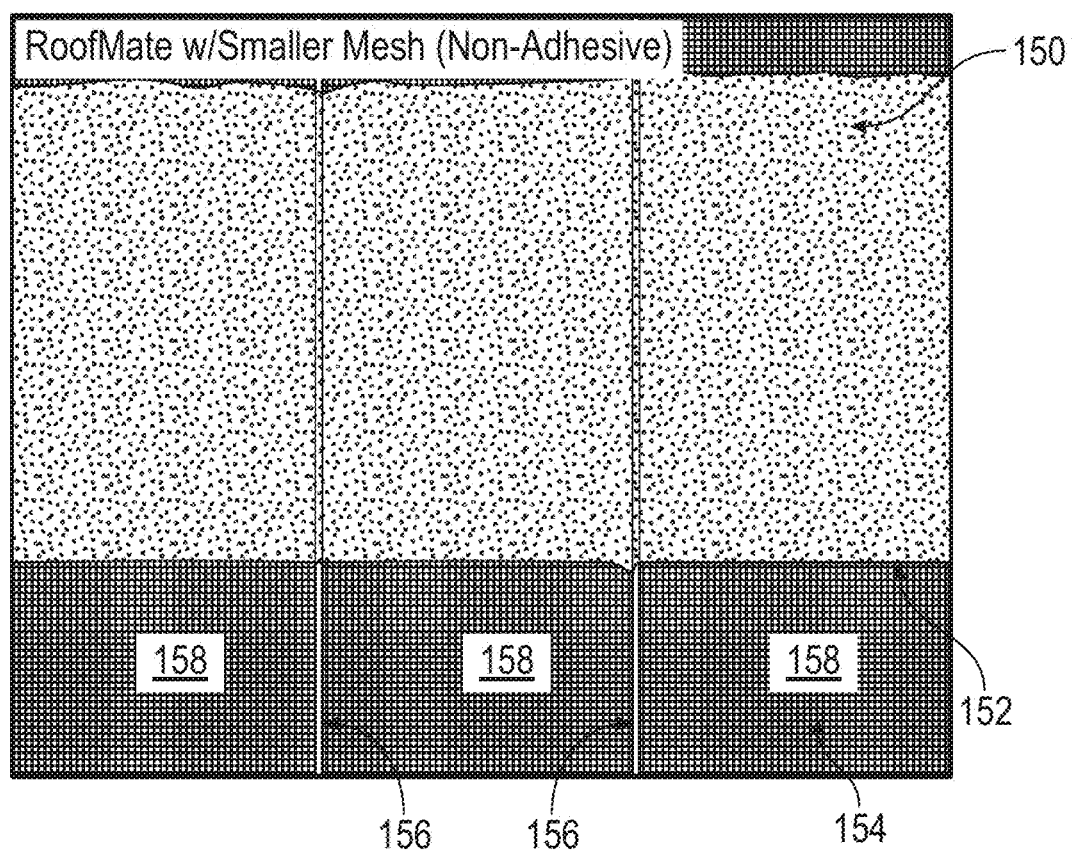
FIG. 9 illustrates another embodiment according to the principles of the present disclosure, illustrating application of a liquid roofing material to a surface pitched at 60 degrees with a mesh underlayment or base layer.

FIG. 9 illustrates an embodiment wherein a roof structure was formed by application of a liquid roofing material 150 including a Roofmate® brand liquid roofing material to a base layer 152 comprising a mesh underlayment with small mesh size attached to a wooden surface 154 exhibiting gaps 156 between roof slats 158. In the embodiment of FIG. 9, the base layer 152 includes a fiberglass mesh with a $\frac{1}{16}$ square mesh size applied across the wooden surface 154 spanning the gaps 156. With this embodiment, the mesh base layer 152 supported the Roofmate® liquid roofing material 150 and sufficient bridged the gaps 156 without pinholes. A membrane 160 formed by the liquid roofing material 150 applied to the $\frac{1}{16}$ inch mesh base layer 152 also exhibited substantially uniform thickness across the surfaces 154 of the slats 158 defining a roofing substrate and spanning the gaps 156 between the slats.

In some examples, a base layer including a mesh underlayment with a mesh size less than $\frac{1}{8}$ inch or less than $\frac{1}{16}$ inch can be used, such as a mesh size between $\frac{1}{64}$ inch and $\frac{1}{8}$ inch, between $\frac{1}{64}$ and $\frac{1}{16}$ inch, between $\frac{1}{64}$ and $\frac{1}{32}$ inch, between $\frac{1}{32}$ and $\frac{1}{8}$ inch, between $\frac{1}{32}$ and $\frac{1}{16}$ inch, between $\frac{1}{16}$ inch and $\frac{1}{8}$ inch.

Figure 10:
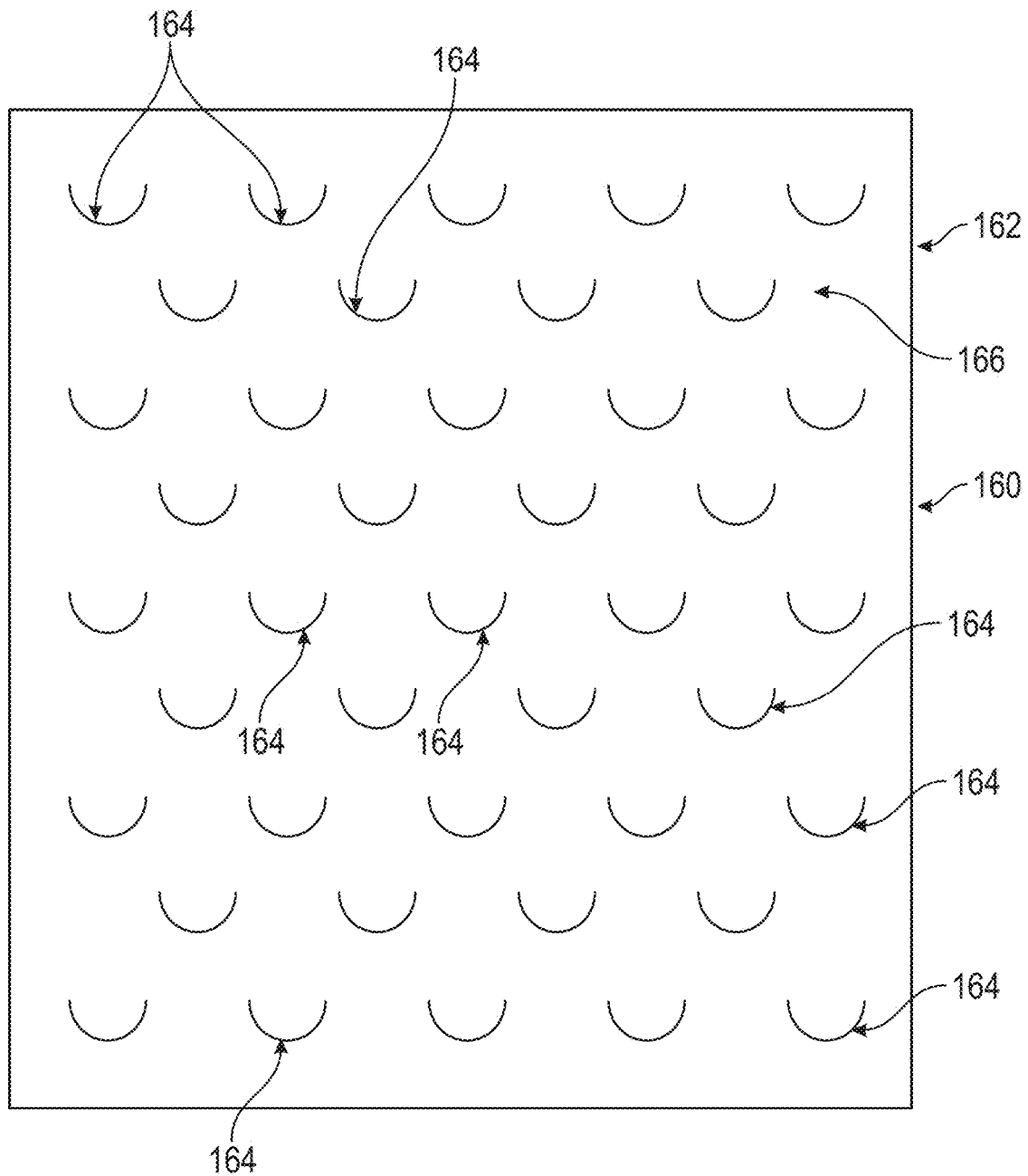
FIG. 10 illustrates another embodiment according to the principles of the present disclosure, including a base layer formed with restraining projections configured to control flowing and sagging of a liquid roofing material.

In another embodiment, as shown in FIG. 10, flowing and sagging of a liquid roofing material 160 can be controlled by use of a base layer 162 incorporating physical flow restraining features or portions 164 into a fabric or composite underlayment 166. FIG. 10 illustrates an example of this wherein the flow restraining features 164 include an array of U-shaped cups or fins that are incorporated into an underlayment 166. Other, varying configuration and/or size restraining features or portions also can be used. The restraining features 164 are arranged in the array so that the features of one row of features overlap the features of adjacent rows of features. In this way, a flow of liquid roofing material applied to the base layer 162 that would evade the features 164 of one row is encountered by the next row so that flowing and sagging overall is contained and restrained.

Figure 11A:
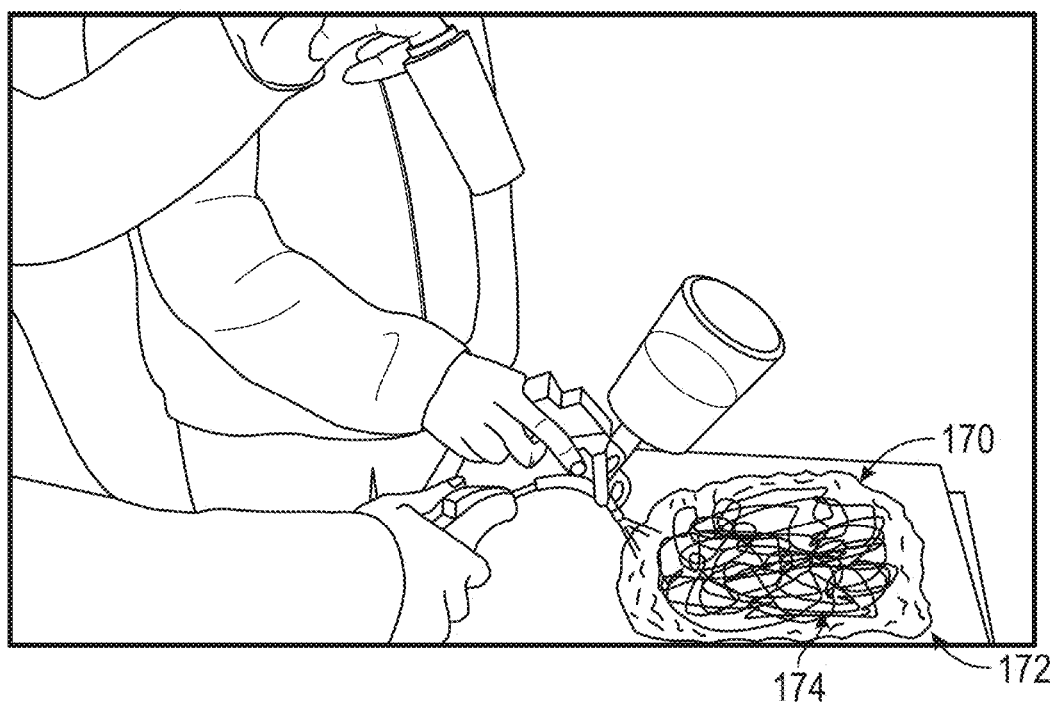
FIG. 11A-11B show still another embodiment according to the principles of the present disclosure, illustrating application of a liquid roofing material and a bulking material to a roofing substrate or surface to control sagging of the liquid roofing material therealong.
Figure 11B:
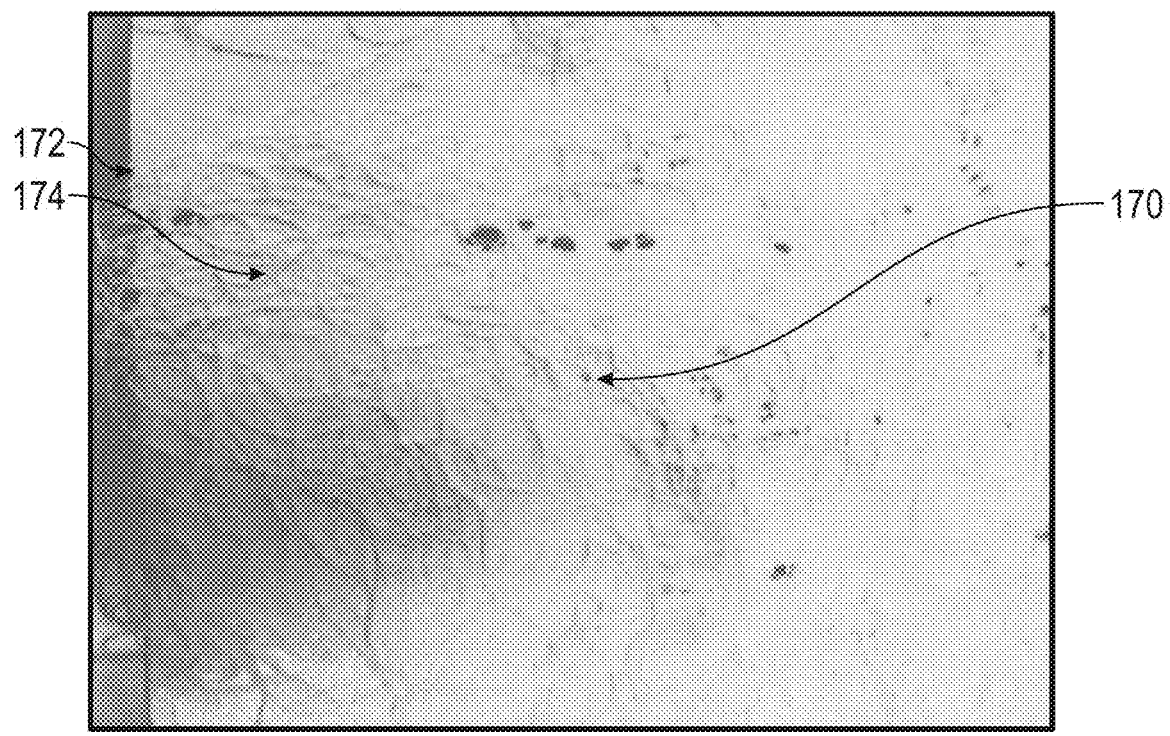

Still further, flowing and sagging of a liquid roofing material can be controlled with bulking materials applied concomitantly with the liquid roofing material in the same area. FIG. 11A illustrates an embodiment wherein a liquid roofing material 170 is applied, such as by spraying or otherwise distributing the liquid roofing material onto a surface 172 while bulking materials 174 are concomitantly projected into the liquid roofing material. For example, the bulking materials 174 can include a string or yarn are projected or otherwise positions onto the same area. In one embodiment, the string or yarn bulk materials can be projected onto the area using compressed air. FIG. 11B shows the result, and as shown in FIG. 11B, the bulking materials 174, e.g., string or yarn or other bulking material, becomes a tangled non-woven mat that is embedded in the resulting membrane. The string or yarn bulking materials 174 adds bulk to the resulting roofing membrane and resists flowing and sagging of the liquid roofing 170 material before it cures. Additional layers of liquid roofing material also may be applied to create a further unitary waterproof membrane if desired.

The systems and methods of forming steep slope roofs using liquid roofing materials according to principles of the present disclosure have been described above in terms of various example embodiments and methodologies. However, it will be appreciated by the skilled artisan that a wide gamut of additions, deletions, and modifications, both subtle and gross, might be made to the illustrated examples without departing from the spirit and scope of the present disclosure.

Figure 12A:
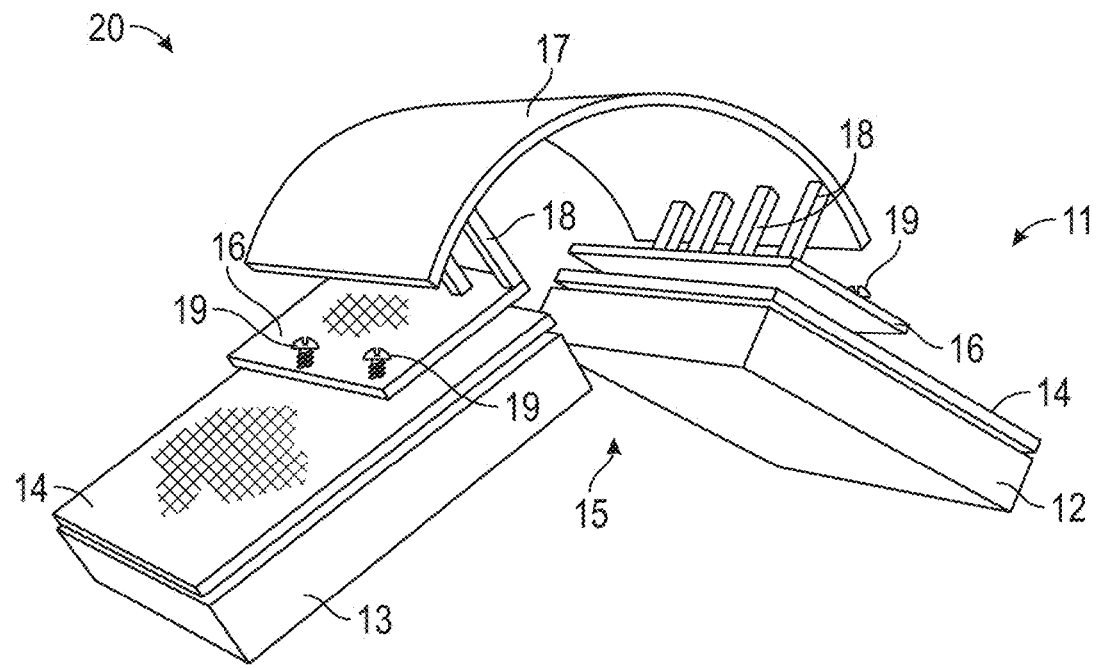
FIGS. 12A-12B illustrate another embodiment of a sloped roof structure with of a roof mounted structure, shown as a ridge vent, that embodies and exemplifies principles of the present disclosure.
Figure 12B:
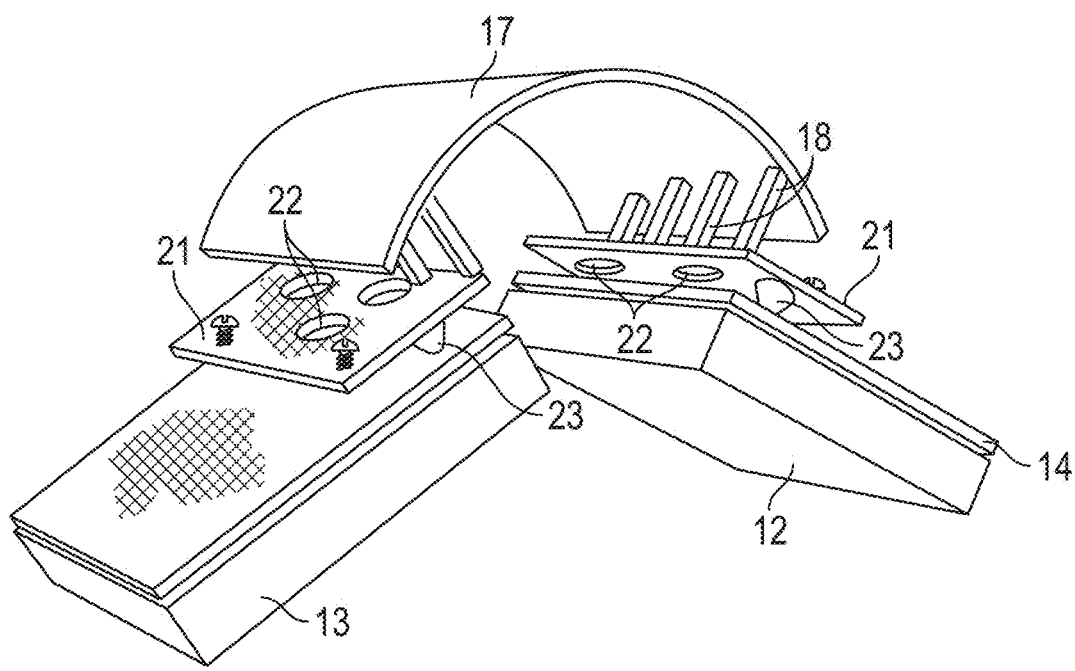

FIGS. 12A-12B are schematic illustrations showing a roof mounted structure in the form of a ridge vent structure 11 for use with a liquid applied roof, for forming a steep slope roof structure. Roof deck sections 12 and 13 meet at a ridge of the roof and a ridge slot 15 is cut along the ridge through which hot attic air can vent. A base layer 14, which can include a mesh fabric underlayment or other underlayment, may be applied to the roof deck sections 12 and 13 in preparation for receiving a liquid roofing material or product. Alternatively, the roof deck sections 12 and 13 can be left exposed without an underlayment if desired.

A ridge vent 20 extends along the ridge of the roof and covers the ridge slot 15. The ridge vent 20, which may be fabricated of injection molded plastic, includes an elongated flexible panel 17 having a central portion and edge portions. While the central panel 17 is illustrated as a simple arch in FIGS. 12A-12B, it will be understood that the central panels of ridge vents can take on any of a number of shapes. Ventilation grids 18 depend from a bottom surface of the flexible panel 17 and extend along each of its edge portions. The ventilation grids 18 allow escaping attic air to flow to the edge portions of the panel 17 and to escape to the atmosphere through the ventilation grids.

A base 16 extends outwardly from beneath each ventilation grid beyond the extreme edges of the panel 17 in this example. In FIG. 12A, the bases 16 are made of a fabric or other mesh material that is pervious to a liquid roofing material to be applied to the roof. The fabric or mesh material of the base 16 may be the same as the underlayment of base layer 14, and can be formed as a portion or extension thereof, or it can be a completely different material so long as it is permeable to a liquid roofing material. The ridge vent 20 is positioned on the roof extending along the roof ridge with its bases 16 resting on the fabric or mesh underlayment 14 covering the roof substrate or deck sections 12 and 13, and can be secured thereto with fasteners, adhesives or other attachment mechanisms. Alternatively, the bases 16 can be secured directly to the roof substrate or deck sections 12 and 13, with fasteners, etc. . . . extending therethrough and into the roof deck sections, and the fabric or mesh underlayment base layer 14 can be installed overlapping the bases of the ridge vent. Where no underlayment is used, the bases 16 can be installed directly on the deck sections 12 and 13.

With the ridge vent installed, the roof can be coated with a liquid roofing material deposited or applied with a sprayer, roller, or other applicator to waterproof and provide protection to the roof. During application, the liquid roofing material is applied over the bases 16 of the ridge vent. While still in its liquid state, the liquid roofing material penetrates the pervious material of the bases 16 and penetrates the material of the base layer 14 if present. In addition, the liquid roofing material will flow into fastener openings formed in the roof deck sections and bases 16/base layer 14 by fasteners securing the ridge vent, so as to seal such openings. When the product cures, the bases 16 and the base layer 14 become embedded and integrated within the resulting membrane and ensure that a continuous waterproof layer is formed over the entire area covered by the bases 16.

FIG. 12B shows an alternate embodiment. All elements are the same as in the embodiment of FIG. 12A except that the bases 21 are formed of a more rigid but impervious material such as plastic. In this embodiment, an array of holes 22 is formed through the bases 21. The bases 21 themselves are raised above the surfaces of the roof deck sections 12 and 13 by a plurality of spacers 23 creating a space below each base. A liquid roofing material is applied to the roof to cover the bases 21. While the liquid roofing material is still in its liquid state, the liquid roofing material seeps through the holes 22 formed through each base to fill the space below. When the liquid roofing material cures, the bases 21 become embedded in the resulting membrane again forming a waterproof layer over the entire area covered by the bases 21.

Figure 13A:
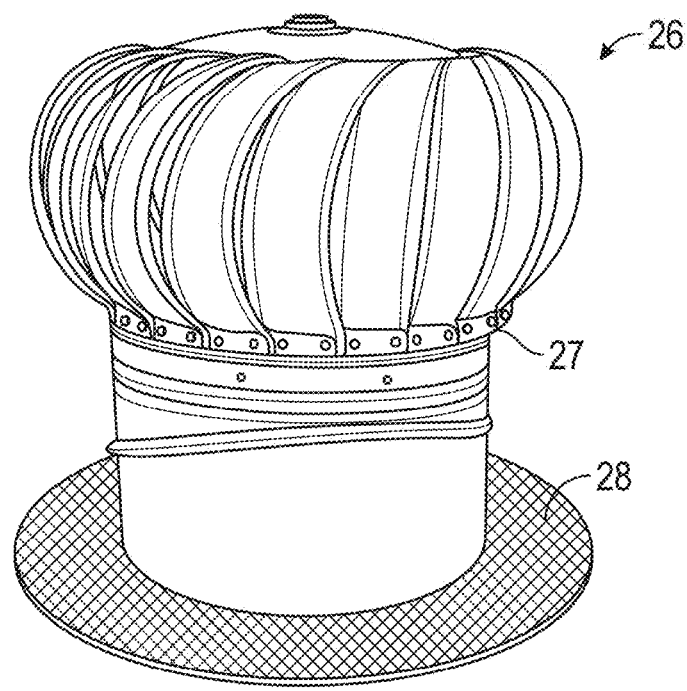
FIGS. 13A-13B illustrate another embodiment of a sloped roof with a roof mounted structure that embodies and exemplifies principles of the present disclosure.

Many other roof mounted structures also can be used along steep slope, residential roofs with a liquid roofing material using the systems and methods according to embodiments of the present disclosure. FIG. 13A show a more generic roof mounted structure 26 in the form here of a twirl vent 27. A fabric or mesh base 28 projects outwardly from the bottom of the structure 26 and is pervious to a liquid roofing material. The structure 26 is mounted to a roof deck with fasteners extending through the base 28. The base 28 can rest atop an underlayment fabric previously applied to a roof deck, or an underlayment fabric can be laid over the base 28, or the base 28 can be secured directly to a roof deck if an underlayment is not to be used, and secured thereto with fasteners such as screws, bolts, adhesives, or other attachment mechanisms. A liquid roofing material is applied overlying the base 28 and penetrates the base and underlayment base layer along the roof substrate, and flows into the fastener openings created by the securing fasteners, forming a continuous waterproof membrane around the structure 26.

Figure 13B:
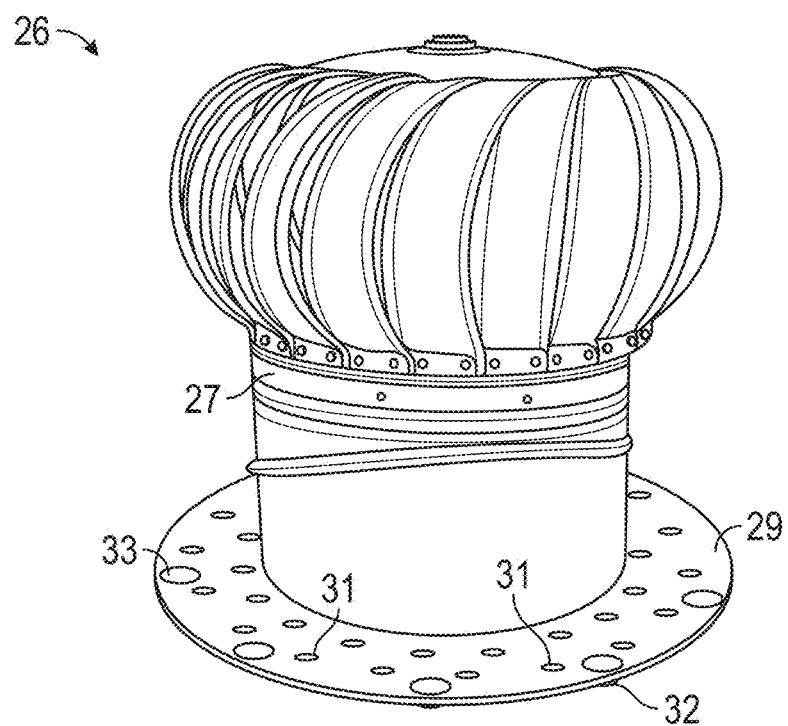

FIG. 13B shows an alternate embodiment of a roof mounted structure 26 for use with liquid roofing materials. Here, a rigid, substantially impervious base 29 projects outwardly from the bottom of the roof mounted structure 26. An array of holes 31 is formed through the base 29 and the base 29 is intermittently dimpled as shown at 33 to form spacers 32 beneath the base. In this way, the base 29 rests on the spacers 32 forming a space between the base 29 and the underlying deck or underlayment fabric of the base layer. A liquid roofing material is applied overlying the base 29. While still in a liquid state, the liquid roofing material penetrates through the holes 31 of the base 29 and fills the space below. Thus, the base 29 becomes embedded in and integrated with the resulting roofing membrane, forming a water tight seal around the structure 26.

Figure 14:
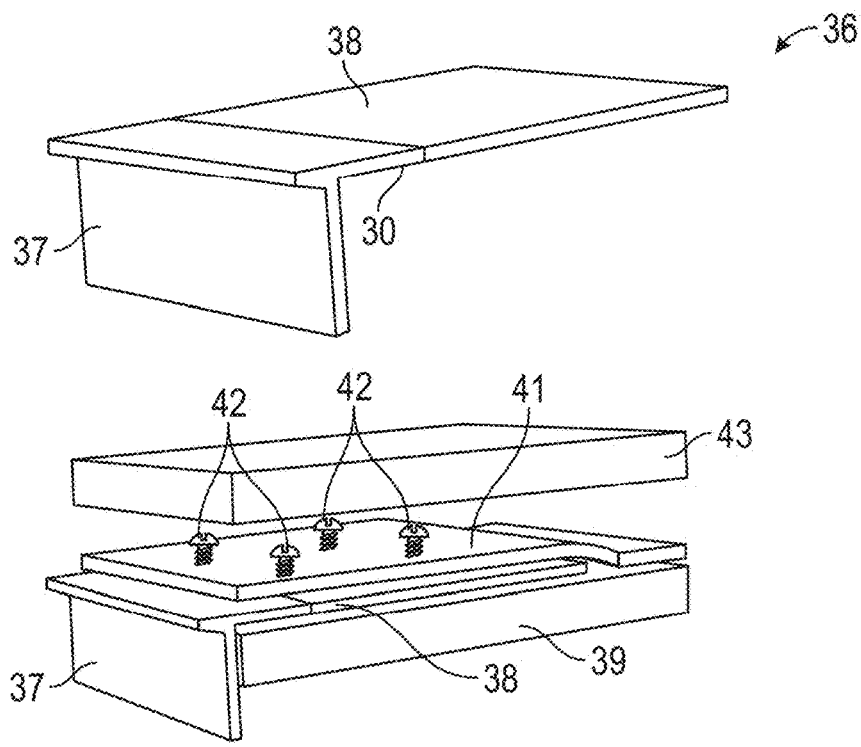
FIG. 14 illustrates another embodiment of a roof mounted structure, comprising a drip edge for forming a sloped roof that embodies and exemplifies principles of the present disclosure.

FIGS. 14-15 and 16A-16B illustrate additional embodiments of a roof mounted structure, here shown as a drip edge 36. FIG. 14 shows in the upper illustration a short section of the drip edge 36, which in reality is much longer and is designed to be installed along the lower edge of a sloped roof. The drip edge 36 in this embodiment includes a rigid or semi-rigid forward edge 37 from which a support flange 30 extends rearwardly. A base of a pervious fabric or mesh material 38 extends rearwardly from the rear edge of the support flange 30. As shown in the lower portion of FIG. 14, the drip edge 36 is installed along a lower edge of a roof deck 39 with the forward edge 37 covering the edge and the base 38 resting on the roof deck, and secured to the roof deck such as by fasteners, adhesives or other attachment mechanisms.

A base layer, which can include a fabric underlayment 41 may then be applied to the roof deck 39 with its lower edge overlapping the base 38 of the drip edge 36. Fasteners 42 can be used to attach the base layer 41 and the base 38 to the roof deck 39. When a liquid roofing material 43 is applied to the roof deck 39 it will flow along and cover the base and base layer/underlayment, as well as flowing into and sealing fasteners openings created by the fasteners; and as the liquid roofing material cures, the base 38 and base layer along the lower edge of the roof deck become embedded in and integrated with the resulting membrane. Accordingly, a waterproof barrier will be formed all the way to the forward edge 37 of the drip edge 36. Water is drained, without leaking, to the forward edge 37, where it drips or flows safely off the roof.

Figure 15:
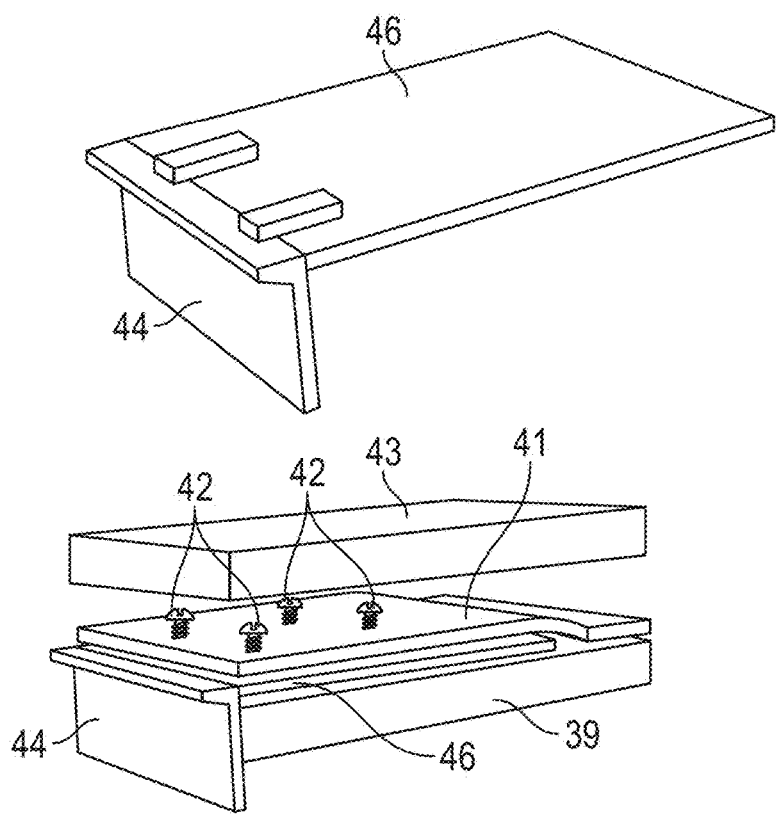
FIG. 15 is an exploded view of the drip edge of FIG. 14.

FIG. 15 shows another example of a steep slope roof structure with a drip edge that embodies principles of the present disclosure. In this embodiment, a pervious base 46 projects rearwardly directly from a forward edge 44 rather from the rear edge of a support flange 30 as in FIG. 14. However, the base 46 in this embodiment is sufficiently rigid to support the forward edge 44 without the rearwardly extending support flange 30. This embodiment can be less costly than that of FIG. 14 because less plastic is used. Installation of this embodiment, shown in FIG. 15, is similar to installation of the embodiment of FIG. 14. Again, a waterproof barrier is formed all the way to the forward edge 44 to prevent leaks along a lower edge of a roof deck.

Figure 16A:
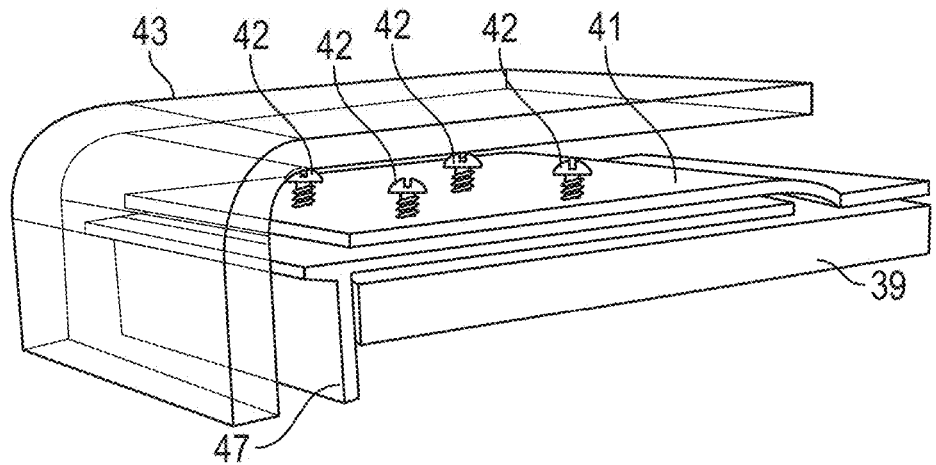
FIG. 16A-16B are partial cut-away views of the drip edge of FIG. 14.

FIG. 16A shows an example of yet another embodiment of a drip edge 47 according to principles of the present disclosure. Here, the entire drip edge 47 is extruded or otherwise formed from a more rigid yet pervious material. The drip edge 47 is positioned along a lower edge of a roof deck and its rearwardly extending base portion is secured to the roof deck, and overlapped with an underlayment fabric 41. Fasteners secure the drip edge 47 and the base layer/underlayment fabric 41 to the roof deck along its edge. A liquid roofing material 43 is applied to the roof deck, penetrating and encapsulating the base layer and the drip edge in the resulting membrane, as well as flowing into the fasteners openings and about the fasteners securing the drip edge to the roof deck. In this embodiment, however, the liquid roofing material 43 is applied to overlap the forward edge of the drip edge 47. When the liquid roofing material 43 cures to form a waterproof membrane, the entire drip edge 47 becomes embedded in and integrated with the membrane. This forms a waterproof edge that sheds rainwater effectively from the lower edge of a roof deck.

Figure 16B:
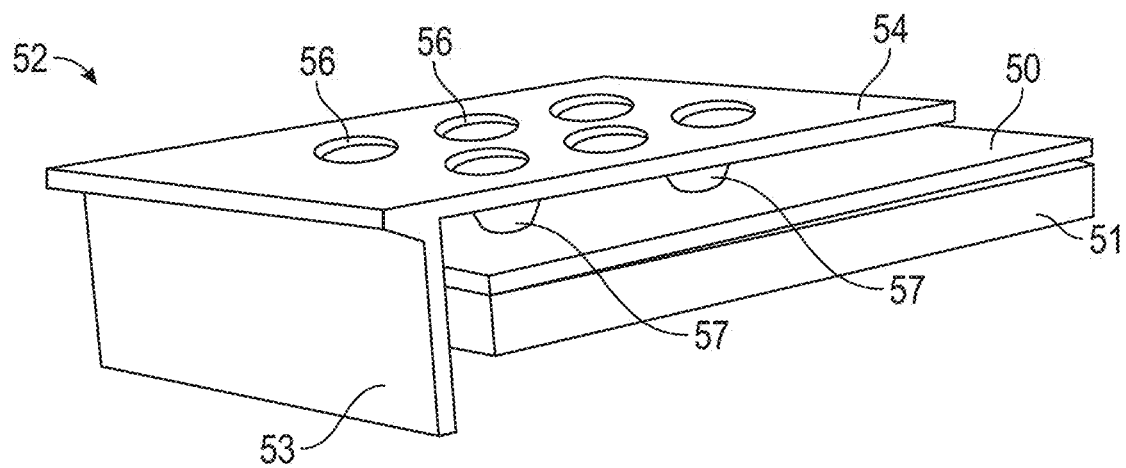

FIG. 16B shows an example of yet another embodiment of a drip edge 52. Here, the drip edge 52 is formed or a rigid material, such as plastic or metal, and has a forward edge 53 and a rearwardly extending base 54. The base 54 is formed with an array of openings 56 extending therethrough. A plurality of spacers 57 project downwardly from the base 54 and rest on a roof deck 51, which may be pre-covered with a mesh 50, to define a space between the base 54 and the roof deck. The drip edge 52 is secured to the roof deck with fasteners that can extend through the base and the space defined between the base and roof deck. When a liquid roofing material is applied to the roof, the material flows through the openings to fill the space below the base 54, as well as flowing about the fasteners and into fastener openings formed thereby. In this way, the base 54 becomes encapsulated in the membrane that results when the liquid roofing material cures to form a water proof interface between the roof membrane and the drip edge.

In the foregoing, non-limiting examples of liquid roofing materials may include Unisil® HS, Roofmate® acrylic, Hydrostop®, all available from GAF of Parsippany, New Jersey, as well as silicone and other materials designed to be applied as a liquid to seal a roof. In the above examples, the rigid base may be made of metal, plastic, rubber, or another appropriately rigid material that provides sufficient support. The permeable or porous bases and/or base layers in the above examples further may be made of polyester, polyethylene, fiberglass, or combinations thereof among other materials. The bases may have a thickness from 3 mils to 50 mils, such as, for example, from 5 mils to 50 mils, 10 mils to 50 mils, 15 mils to 50 mils, 20 mils to 50 mils, 25 mils to 50 mils, 30 mils to 50 mils, 35 mils to 50 mils, 40 mils to 50 mils, 45 mils to 50 mils, 5 mils to 45 mils, 5 mils to 40 mils, 5 mils to 35 mils, 5 mils to 30 mils, 5 mils to 25 mils, 5 mils to 20 mils, 5 mils to 15 mils, 5 mils to 10 mils, 10 mils to 40 mils, 10 mils to 30 mils, 20 mils to 40 mils, 20 mils to 30 mils, 3 mils to 40 mils, 3 mils to 30 mils, 3 mils to 20 mils, 3 mils to 15 mils, or 3 mils to 10 mils, and may be coated with a material such as a polymeric material, e.g., PVC. The following table shows characteristics of a porous base suitable for use in the examples presented above.

| Pattern | 8 × 7.5 yarns/in | 5 × 5 yarns/in | |
|---|---|---|---|
| Tensile | 60 × 65 lbs/in | 50 × 45 lbs./in | 60 × 45 lbs/in |
| Elongation | Less than 5 to 10% | | |
| Weight | 2 to 4 oz./yd$^2$ | | |
| Coating | PVC | | |

The terms hydrophobic and hydrophobicity as used herein carry the traditional meaning of a material resulting in a water contact angle greater than ninety degrees (90°) as measured through a water droplet on a surface of the material. Such a material repels water. The terms lipophilic and lipophilicity as used herein means a material that absorbs, attracts, or mixes with fats, oils, lipids, and non-polar solvents such as hexane or toluene. Such a material absorbs oils and oil-based solvents and liquids and/or include materials that can combine with or dissolve in lipids or fats.

In still further embodiments, a temporary roofing material may be formed of a base layer formed from a web or sheet of mesh, fabric, or other material properly dimensioned to be rolled out and secured on a damaged roof deck, perhaps in overlapping courses. The base layer may have a thickness from about 3 mils to about 50 mils and may comprise polyester, metal, fiberglass, or another appropriate material. For example, the base layer may have a thickness from 5 mils to 50 mils, 10 mils to 50 mils, 15 mils to 50 mils, 20 mils to 50 mils, 25 mils to 50 mils, 30 mils to 50 mils, 35 mils to 50 mils, 40 mils to 50 mils, 45 mils to 50 mils, 5 mils to 45 mils, 5 mils to 40 mils, 5 mils to 35 mils, 5 mils to 30 mils, 5 mils to 25 mils, 5 mils to 20 mils, 5 mils to 15 mils, 5 mils to 10 mils, 10 mils to 40 mils, 10 mils to 30 mils, 20 mils to 40 mils, 20 mils to 30 mils, 3 mils to 40 mils, 3 mils to 30 mils, 3 mils to 20 mils, 3 mils to 15 mils, or 3 mils to 10 mils.

The base layer web or sheet may be coated with lipophilic material such as wax, silicone oils, or other appropriate lipophilic materials. The base web or sheet exhibits hydrophobicity and lipophilicity, meaning that it repels rainwater but allows oil-based materials to soak through. In this way, the temporary roof protects the building below from rainwater.

In one embodiment, hydrophobic properties of the base layer may be achieved by embossing, imprinting, or etching the surface of the web of the base layer with micro or nanostructures that create the lotus effect on the surface of the web (lotus effect structures).

In another embodiment, the base layer may be a multi-layer composite material such as a lipophilic mesh or fabric with a thin layer of a hydrophobic protective sheet laminated to a top surface thereof. In such an embodiment, the protective sheet can be removed just before applying a permanent roofing material such as a liquid roofing material. In this way, the temporary roofing web repels water while exposed, but absorbs an oil-based liquid roofing material when the permanent roof is installed.

In another embodiment, the temporary roofing web may achieve hydrophobicity using an ingredient on the web that is removed or dissolved during application of a permanent liquid roofing material. For example, the web may have a layer of wax that exhibits high solubility to lipophilic material on its top surface that is dissolved away upon contact with a liquid roofing material with lower solids content and higher solvent content. A non-limiting example of such a wax is paraffin and a non-limiting example of a suitable liquid roofing material is Unisil® LS available from GAF of Parsippany, New Jersey Such an embodiment eliminates the need to peel off a protective layer before applying the permanent roofing material.

The temporary roofing system may be installed quickly and easily onto a roof deck or substrate by rolling out the web onto the substrate and attaching it with staples of fasteners. Alternatively, adhesive may be used or the back of the web may be supplied with a contact or peel-and-stick adhesive that adheres to the roof structure as the web is rolled out.

The lipophilic portion of the temporary roofing web is constructed to allow a liquid roofing material to penetrate through and form contact with the roof deck and structures below. Thus, a tight, monolithic, waterproof envelope is formed atop an entire residential roof upon application of the liquid roofing material over the temporary roofing web. Accordingly, the temporary roofing web may be left in place upon installation of the liquid applied roof.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

What is claimed is:

1. A temporary roofing system comprising:
a base layer overlaid on a roofing substrate;
  wherein the base layer comprises a permeable mesh;
a lipophilic coating applied on an upper facing surface of the base layer;
  wherein the lipophilic coating consists of a wax, a silicone oil, or a combination thereof;
a protective layer positioned along the lipophilic coating of the base layer, the protective layer comprising a sheet of a hydrophobic material releasably attached to the lipophilic coating of the base layer;
  wherein the protective layer is removable from the lipophilic coating of the base layer and is adapted to deter water flow through the base layer; and
  wherein when the protective layer is removed and the lipophilic coating is exposed, the base layer is configured to at least partially receive a liquid roofing material therethrough to form a permanent roofing structure.

2. The temporary roofing system of claim 1, wherein the lipophilic coating comprises a material adapted to dissolve upon contact with the liquid roofing material.

3. The temporary roofing system of claim 1, wherein the base layer further comprises a plurality of restraining features adapted to restrain at least a portion of the liquid roofing material along the roofing substrate to control flowing and sagging of the liquid roofing material of the liquid roofing material.

4. A temporary roofing system comprising:
a base layer overlaid on a roofing substrate;
  wherein the base layer comprises a permeable mesh;
a lipophilic coating applied to the base layer;
  wherein the lipophilic coating consists of a wax, a silicone oil, or a combination thereof;
a protective layer positioned along an upper facing surface of the base layer;
  wherein the protective layer is removable from the upper facing surface of the base layer and comprises a hydrophobic material adapted to deter water flow through the base layer; and
  wherein when the protective layer is removed and the lipophilic coating is exposed, the base layer is configured to at least partially receive a liquid roofing material therethrough to form a permanent roofing structure.

5. The temporary roofing system of claim 4, wherein the lipophilic coating comprises a material adapted to dissolve upon contact with the liquid roofing material.

6. The temporary roofing system of claim 4, wherein the base layer further comprises a plurality of restraining features adapted to restrain at least a portion of the liquid roofing material along the roofing substrate to control flowing and sagging of the liquid roofing material of the liquid roofing material.

7. The temporary roofing system of claim 4, wherein the liquid roofing material comprises polysiloxane, polyurea, polyurethane, silane modified ether, silane modified ester, silane modified polyurethane, silane modified polyurea, epoxy, acrylic, poly acrylic, or combinations thereof.

* * * * *